April 8, 1952  J. B. LONG  2,592,302
MOUSE OR RAT TRAP
Filed April 17, 1950
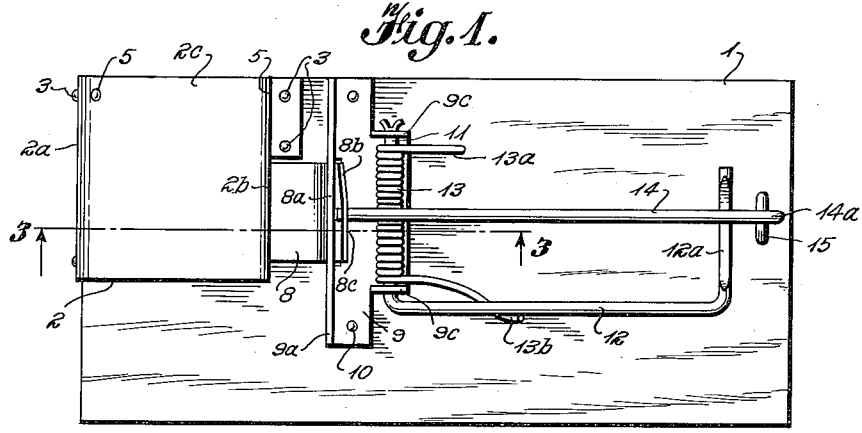
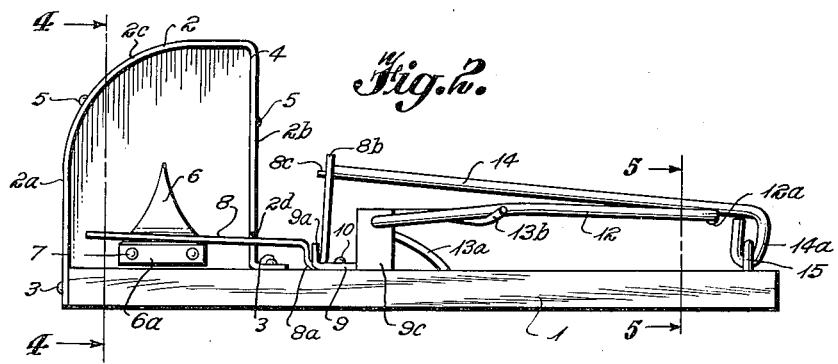
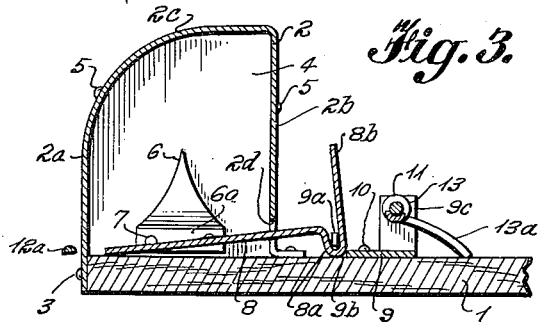
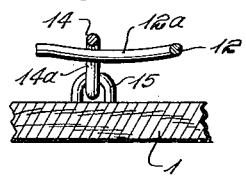
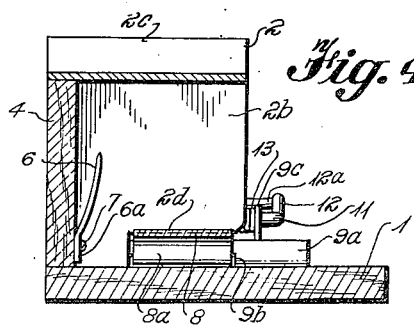
INVENTOR
*John B. Long*
BY  *Alexander Powell*
ATTORNEYS Patented Apr. 8, 1952

2,592,302

UNITED STATES PATENT OFFICE 2,592,302

MOUSE OR RAT TRAP

John B. Long, Annville, Pa.

Application April 17, 1950, Serial No. 156,406

9 Claims. (Cl. 43—81)

This invention is a novel improvement in mouse or rat traps, and the principal object thereof is to provide a mouse or rat trap which will be simple in construction, and efficient in operation, the same embodying certain novel features of construction hereinafter set forth.

I will explain the invention with reference to the accompanying drawing, which illustrates one practical embodiment thereof, to enable others familiar with the art to adopt and use the same; and will summarize in the claims, the novel features of construction, and novel combinations of parts, for which protection is desired.

In said drawing:

Figure 1 is a top plan view of my novel mouse or rat trap in set position.

Fig. 2 is a side elevation thereof.

Fig. 3 is a longitudinal section on the line 3—3, Fig. 1, but showing the trap in sprung position Fig. 4 is a transverse vertical section on the line 4—4, Fig. 2.

Fig. 5 is a transverse vertical section on the line 5—5, Fig. 2.

As shown, my novel mouse or rat trap preferably comprises a base 1 formed of wood or other light rigid material, the same being substantially rectangular in plan.

Adjacent one corner of base 1 is a housing 2 having vertical side walls 2a—2b, connected at their upper ends by a curved or other wall 2c, to form a substantially inverted U-shaped housing, the lower ends of the end housing being connected to the base 1 by nails or screws 3 or the like, the housing being open at both ends.

The outer end of housing 2 is closed by a wall 4 (Figs. 3 and 4) which is secured within the housing 2 by means of nails or screws 5 or the like; and wall 4 carries adjacent its lower end a bait-holding spike 6 having a base 6a secured by nails 7 or the like to the inner face of wall 4, said spike 6 being adapted to hold thereon a piece of cheese or other bait (not shown) so that the bait is held suspended above the top of base 1. The end of casing 2 opposite the end wall 4 is open, as shown in Fig. 4.

The inner side wall 2b of housing 2 has a horizontal slot 2d in its lower end immediately above base 1, through which slot 2d passes a treadle 8, which is normally disposed substantially horizontally adjacent the base 6a of spike 6, as shown in Figs 2 and 3, for the purpose hereinafter described.

On base 1, parallel with and spaced from the wall 2b is a plate 9 secured thereto by nails or screws 10 or the like, plate 9 having a vertical flange 9a provided adjacent its lower end with a slot 9b (Fig. 3); and the outer end of treadle 8 has a downwardly offset portion 8a which passes through slot 9b with its inner end extending upwardly as at 8b, substantially normal to the treadle portion 8, as clearly shown in Figs. 2 and 3, the treadle 8 and its upwardly extending portion 8b being thus pivotally mounted on base 1, so that the treadle 8 may be swung from its uppermost position shown in Fig. 2 to its lowermost position shown in Fig. 3. In the upwardly extending portion 8b is a centrally disposed hole 8c, for the purpose hereinafter described.

Plate 9 is provided with opposed ears 9c which are provided with opposed perforations in which is journaled the shaft 11 of a hammer bar 12 which is preferably formed integrally with shaft 11 and is adapted to be swung from the position shown in Figs. 1 and 2 to the position shown in Fig. 3. Hammer bar 12 is disposed parallel with and adjacent the open end of casing 2, and its outer end carries a flattened portion 12a disposed at right angles to the hammer bar 12 opposite the housing 2, as clearly shown in Fig. 1. The hammer bar 12 is normally yieldably urged for rotation across the open face of housing 2 by a coiled spring 13 on the shaft 11 having one end 13a (Fig. 1) engaging the top of base 1 and its opposite end 13b engaging the hammer bar 12, so that the spring 13 will forcibly swing the hammer bar 12 across the open face of casing 2.

In order to maintain the hammer bar 12 in the position shown in Figs. 1 and 2, a trip rod 14 is provided, the same being adapted to overlie the flattened portion 12a of hammer bar 12 with its outer end entering the perforation 8c of the upwardly extending portion 8b of treadle 8. The opposite end of trip rod 14 is provided with an eye 14a which is pivoted in an eyelet 15 on base 1 so as to be freely vertically swingably mounted therein.

*In operation*

In operation, the bait is impaled upon the spike 6 within housing 2, and the treadle 8 is initially raised into the position shown in Fig. 2. The hammer bar 12 would then be urged against the action of the spring 13 so as to have its outer portion 12a underlying the trip rod 14, while the trip rod 14 would have its free end engaged in the hole 8c in the upwardly extending portion 8b of treadle 8. The trap in this position is loaded, and it is noted that the bait is not carried by the treadle 8.

The mouse or rat on seeking the bait impaled upon spike 6 would have to insert its head into the open end of casing 2 and to step upon treadle 8 in order to reach the bait. In so doing the treadle 8 would be pushed downwardly from the position shown in Fig. 2 into the position shown in Fig. 3, thereby disengaging the free end of the trip rod 14 from the perforation 8c in the upwardly extending portion 8b of the treadle 8, whereupon the spring 13, being under tension, would forcibly swing the hammer bar 12 from the position shown in Figs. 1 and 2 into the position shown in Fig. 3, in which the same would swing downwardly with considerable force across the open end of casing 2, thereby forcibly striking the neck or adjacent portions of the mouse or rat, according to the strength of spring 13.

In view of the construction shown, there is no other way in which the mouse or rat could obtain access to the bait impaled upon the spike 6; and thus my novel mouse or rat trap is very positive in operation, as well as simple in construction, my novel trap having a minimum number of working parts.

I do not limit my invention to the exact form shown in the drawing, for obviously changes may be made therein within the scope of the claims.

I claim:

1. A mouse or rat trap, comprising a base; a housing on said base open at one end; a bait holder on the closed end wall of the housing; a treadle extending through a horizontal slot in one side wall of the housing below the holder; means for pivoting said treadle on said base; an upwardly extending portion on said treadle exterior to the housing disposed substantially at right angles to the portion within the housing and provided with a hole; a hammer bar having a shaft at one end pivoted on the base parallel with the pivot means, and having its outer end disposed opposite the housing; spring means for normally swinging the hammer bar across the open end of the housing; and a trip rod pivoted on the base and adapted to enter the hole in the upwardly extending portion with said outer end of the hammer bar underlying the trip rod when the treadle is in raised position, whereby downward movement of the treadle will release the trip rod and hammer bar.

2. In a trap as set forth in claim 1, a plate on said base provided with an elongated slot; and said treadle having a portion adjacent the upwardly extending portion engaging said slot and forming said pivot means.

3. In a trap as set forth in claim 2, said plate having opposed perforated ears in which said shaft is journaled.

4. A mouse or rat trap, comprising a base; a housing on said base; said housing being open at one end; a bait holding spike on the closed end wall of the housing; a vertically movable treadle extending through a horizontal slot in one side wall of the housing below the spike; means for pivoting said treadle on said base; an upwardly extending portion on said treadle exterior to the housing disposed substantially at right angles to the portion within the housing and provided with a centrally disposed hole; a hammer bar having a shaft at one end pivoted on the base parallel with the pivot means, and having its other end offset at substantially right angles and disposed opposite the housing; spring means around said shaft for normally swinging the hammer bar across the open end of the housing; and a trip rod having one end pivoted on the base and its other end adapted to enter the hole in the upwardly extending portion with said offset end of the hammer bar underlying the trip rod when the treadle is in raised position, whereby downward movement of the treadle will release the trip rod and hammer bar.

5. In a trap as set forth in claim 4, a plate on said base having an upstanding flange provided with an elongated slot in its base; and said treadle having a downwardly offset portion adjacent the upwardly extending portion engaging said slot and forming said pivot means.

6. In a trap as set forth in claim 5, said plate having opposed perforated ears in which said shaft is journaled.

7. A mouse or rat trap, comprising a base; an inverted U-shaped housing mounted on said base adjacent one corner thereof, said housing being open at both ends; an end wall closing the outer end of the housing; a bait holding spike carried by said end wall; a vertically movable treadle extending through a horizontal slot in one side wall of the housing below the spike; means for pivoting said treadle on said base; an upwardly extending portion on said treadle exterior to the housing disposed substantially at right angles to the portion within the housing and provided with a centrally disposed hole; a hammer bar having a shaft at one end pivoted on the base parallel with the pivot means, and having its other end offset at substantially right angles and disposed opposite the housing; spring means around said shaft for normally swinging the hammer bar across the open end of the housing; and a trip rod having one end pivoted on the base and its other end adapted to enter the hole in the upwardly extending portion with said offset end of the hammer bar underlying the trip rod when the treadle is in raised position, whereby downward movement of the treadle will release the trip rod and hammer bar.

8. In a trap as set forth in claim 7, a plate on said base having an upstanding flange provided with an elongated slot in its base; and said treadle having a downwardly offset portion adjacent the upwardly extending portion engaging said slot and forming said pivot means.

9. In a trap as set forth in claim 7, a plate on said base having an upstanding flange provided with an elongated slot in its base; and said treadle having a downwardly offset portion adjacent the upwardly extending portion engaging said slot and forming said pivot means, and said plate having opposed perforated ears in which said shaft is journaled.

JOHN B. LONG.

REFERENCES CITED

The following references are of record in the file of this patent:

UNITED STATES PATENTS

| Number | Name | Date |
| --- | --- | --- |
| 1,414,066 | Beilharz | Apr. 25, 1922 |
| 1,690,369 | Harte | Nov. 6, 1928 |
| 1,974,289 | Nord | Sept. 18, 1934 |
| 2,489,093 | Lehn | Nov. 22, 1949 |

FOREIGN PATENTS

| Number | Country | Date |
| --- | --- | --- |
| 28,004 | Great Britain | 1906 |